(12) United States Patent
Kimura et al.

(10) Patent No.: US 8,258,914 B2
(45) Date of Patent: Sep. 4, 2012

(54) TOUCH PANEL AND METHOD OF MANUFACTURING THE SAME

(75) Inventors: Kiyohiro Kimura, Miyagi (JP); Masao Ono, Miyagi (JP); Takao Murooka, Tochigi (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 12/819,600

(22) Filed: Jun. 21, 2010

(65) Prior Publication Data

US 2011/0128114 A1   Jun. 2, 2011

(30) Foreign Application Priority Data

Jun. 30, 2009   (JP) .............................. P2009-155204

(51) Int. Cl.
  *H01C 7/00* (2006.01)
(52) U.S. Cl. .......... 338/13; 338/334; 200/600; 428/327; 345/173
(58) Field of Classification Search ................ 338/13, 338/226, 333, 334; 200/600; 428/327, 323; 252/582; 313/506, 509, 512; 345/173
See application file for complete search history.

(56) References Cited

U.S. PATENT DOCUMENTS

| | | | | |
|---|---|---|---|---|
| 5,250,214 A | * | 10/1993 | Kanemoto et al. | 252/299.01 |
| 7,118,936 B2 | * | 10/2006 | Kobayashi et al. | 438/99 |
| 7,294,395 B2 | * | 11/2007 | Itoh et al. | 428/327 |
| 7,569,765 B2 | * | 8/2009 | Matsui et al. | 136/263 |

FOREIGN PATENT DOCUMENTS

JP   2005-0158549   6/2005

* cited by examiner

*Primary Examiner* — Kyung Lee
(74) *Attorney, Agent, or Firm* — K&L Gates LLP

(57) ABSTRACT

A touch panel includes a first transparent electrode substrate, a second transparent electrode substrate, a first bonding layer, a first transparent substrate, and a second bonding layer. The first transparent electrode substrate includes a first wiring pattern, a first surface, a second surface, and a first path. The second transparent electrode substrate includes a second wiring pattern, a third surface, a fourth surface, and a second path. The second path causes the third surface and the fourth surface to communicate with each other. The first bonding layer includes a first peripheral area, an opening area, and a third path. The first bonding layer bonds the first transparent electrode substrate and the second transparent electrode substrate to each other. The first transparent substrate is opposed to the second surface. The second bonding layer includes a first opening portion.

7 Claims, 7 Drawing Sheets

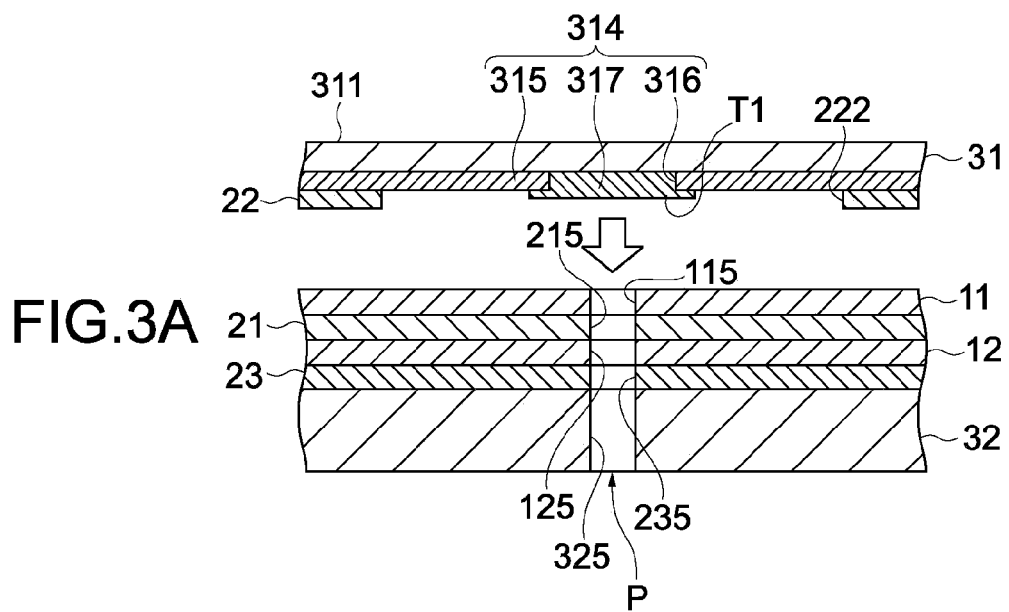
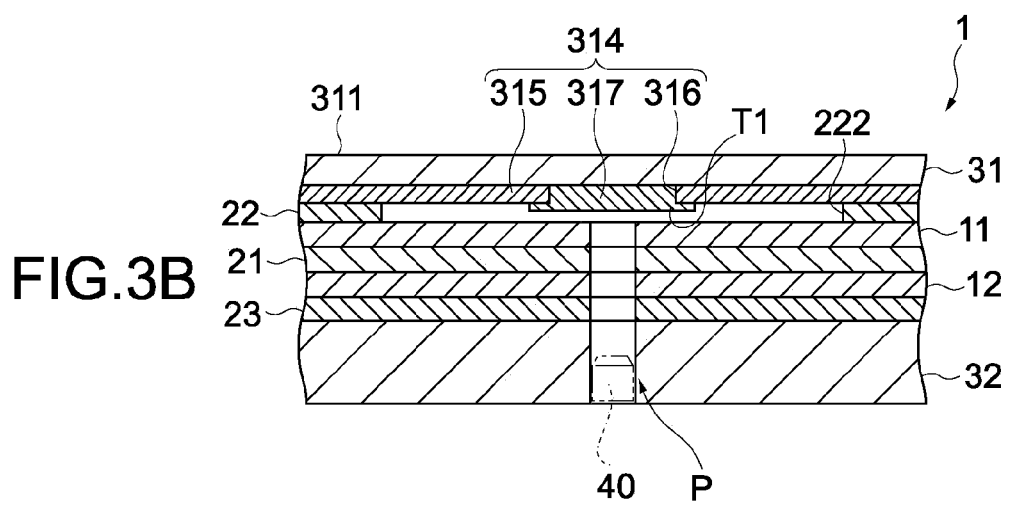

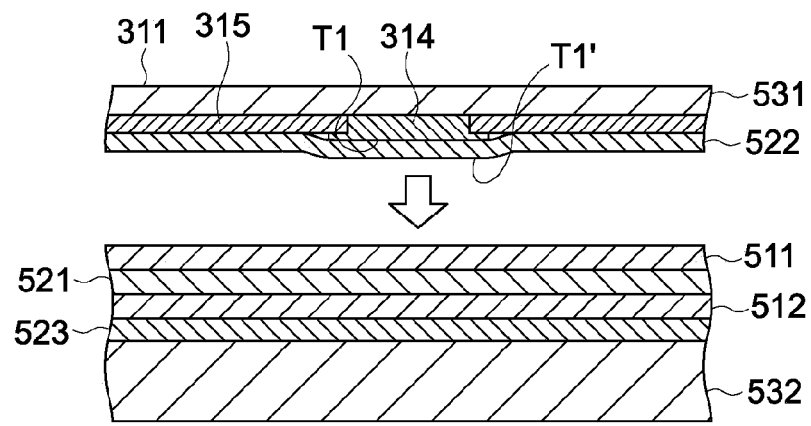
FIG.6A
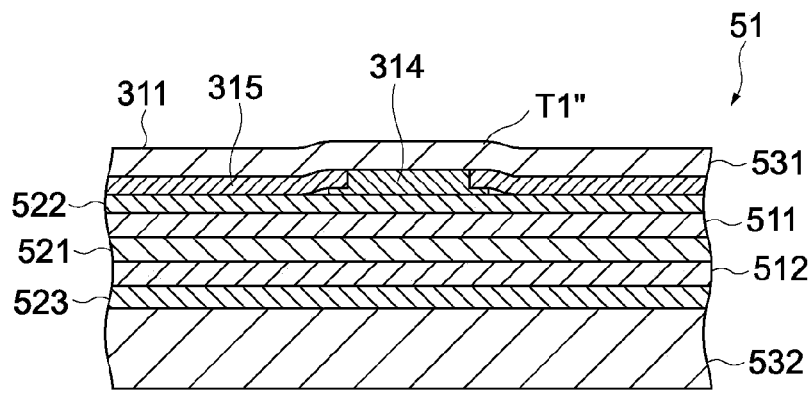
FIG.6B
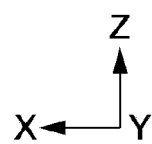

TOUCH PANEL AND METHOD OF MANUFACTURING THE SAME

CROSS REFERENCES TO RELATED APPLICATIONS

The present application claims priority to Japanese Priority Patent Application JP 2009-155204 filed in the Japan Patent Office on Jun. 30, 2009, the entire content of which is hereby incorporated by reference.

BACKGROUND

The present application relates to a touch panel used for a screen-input type display apparatus or the like and to a method of manufacturing the same.

For example, there is widely known a touch panel of an analog resistive film type that detects input coordinates by using a resistance change amount. For example, Japanese Patent Application Laid-open No. 2005-158549 (paragraphs 0042 and 0045, FIGS. 1 and 4) discloses a touch panel of a resistive film type having a laminated body obtained by bonding a first substrate to a second substrate by a first bonding adhesive that surrounds a predetermined area. The touch panel has an air hole used for forcing excess air out of a pressed space at a time when a laminated body is bonded onto a bonding target (display target). With this structure, the generation of air accumulation on a bonded surface due to a reaction force of the pressed space can be prevented. In addition, an operation load of the touch panel can be reduced.

SUMMARY

Incidentally, in recent years, a touch panel of so-called a full-flat type is becoming the mainstream of the touch panel. Such a touch panel has been devised to increase the commercial value thereof by applying various designs to a peripheral area of an image display area.

However, in the peripheral area, a wiring pattern that is electrically connected to a resistive film is formed, which may cause unevenness corresponding to the shape of the wiring pattern on the surface of the touch panel when the laminated body is formed. In this case, it may be impossible to maintain a desired flatness of the touch panel, which may cause a problem of impairing the commercial value.

To address the above-mentioned problem, conceived is a countermeasure in which the thickness of an adhesive layer that bonds the first and second substrates is increased, thereby absorbing the thickness of the wiring pattern, to prevent the shape of the wiring pattern from being brought into relief from the surface of the touch panel. However, the increase of the thickness of the adhesive layer increases a distance between the first substrate and the second substrate, making the operation load of the touch panel larger. Thus, the desirable operability of the touch panel is difficult to be maintained.

In view of the above-mentioned circumstances, it is desirable to provide a touch panel and a method of manufacturing the same capable of maintaining the flatness of the surface while maintaining the desirable operability.

According to an embodiment, there is provided a touch panel including a first transparent electrode substrate, a second transparent electrode substrate, a first bonding layer, a first transparent substrate, and a second bonding layer.

The first transparent electrode substrate includes a first wiring pattern, a first surface, a second surface, and a first path. The first wiring pattern is formed on the first surface, the second surface is opposite to the first surface, and the first path causes the first surface and the second surface to communicate with each other.

The second transparent electrode substrate includes a second wiring pattern, a third surface, a fourth surface, and a second path. The second wiring pattern is formed on the third surface, the fourth surface is opposite to the third surface, and the second path causes the third surface and the fourth surface to communicate with each other.

The first bonding layer includes a first peripheral area, an opening area, and a third path. The first bonding layer bonds the first transparent electrode substrate and the second transparent electrode substrate to each other in the first peripheral area. The first peripheral area is provided between the first surface and the third surface to cover the first wiring pattern and the second wiring pattern. The opening area causes the first surface and the third surface to be separated from and opposed to each other. The third path is formed in the first peripheral area and causes the first path and the second path to communicate with each other.

The first transparent substrate is opposed to the second surface.

The second bonding layer includes a first opening portion that is opposed to a formation area of the first wiring pattern and communicated with the first path. The second bonding layer bonds the second surface and the first transparent substrate to each other.

In the touch panel, the first transparent electrode substrate is bonded to the second transparent electrode substrate through the first bonding layer. The first bonding layer is intervened between the first and second wiring patterns, thereby electrically insulating the first and second wiring patterns from each other. The first wiring pattern is buried in the first transparent electrode substrate by the bonding pressure of the transparent electrode substrates, thereby raising the second surface. The raised portion of the second surface is contained in the first opening portion formed in the second bonding layer at the time of bonding to the first transparent substrate. Further, at the time of bonding to the first transparent substrate, air stored in the opening portion is exhausted to the outside of the second transparent electrode substrate through the first path, the third path, and the second path. Accordingly, the flatness of the first transparent substrate is prevented from being impaired due to the raised portion and the residual air in the first opening portion. In addition, the desired flatness of the first transparent substrate can be ensured without increasing the thickness of the first bonding layer.

The touch panel may further include a second transparent substrate and a sealing member. The second transparent substrate includes a fourth path that is communicated with the second path. The second transparent substrate is bonded to the fourth surface. The sealing member seals the fourth path.

By providing the second transparent substrate, the rigidity of the touch panel is increased, and the predetermined flatness can be given to the touch panel. Further, by closing the fourth path with the sealing member, a desired inner pressure of the first opening portion can be maintained, and water or a foreign matter can be prevented from getting into the touch panel.

The first transparent substrate may further include a decorative layer. The decorative layer has a protrusion portion and is formed in a second peripheral area corresponding to the first peripheral area. The protrusion portion is protruded toward the second surface. In this case, the second bonding layer further includes a second opening portion that is opposed to a formation area of the decorative layer and communicated with the first path.

With this structure, in the state where the protrusion portion of the decorative layer is contained in the second opening portion, the first transparent substrate can be bonded to the second surface. As a result, the flatness of the first transparent substrate can be prevented from degrading due to the protrusion portion of the decorative layer.

The first opening portion and the second opening portion may be communicated with each other in the second peripheral area.

With this structure, the first and second opening portions can be connected commonly through the first to third paths.

The decorative layer can be formed of a first printing pattern and a second printing pattern. The first printing pattern is formed in the second peripheral area. The second printing pattern is formed partially on the first printing pattern. In this case, the protrusion portion is formed of the second printing pattern.

With this structure, the design effect of the decorative layer is increased, which can enhance the design of the touch panel.

According to another embodiment, there is provided a method of manufacturing a touch panel includes bonding a first transparent electrode substrate and a second transparent electrode substrate to each other by using a first bonding sheet. The first transparent electrode substrate has a first through hole and a first wiring pattern. The second transparent electrode substrate has a second through hole and a second wiring pattern. The first bonding sheet has a third through hole that is aligned to the first through hole and the second through hole and covers the first wiring pattern and the second wiring pattern.

A first transparent substrate is bonded onto the first transparent electrode substrate through a second bonding sheet. The second bonding sheet has an opening portion, the opening portion is formed in an area corresponding to a formation area of the first wiring pattern and is communicated with the first through hole.

In the method of manufacturing the touch panel, the first transparent electrode substrate is bonded to the second transparent electrode substrate through the first bonding sheet. The first bonding sheet is intervened between the first and second wiring patterns, thereby electrically insulating the first and second wiring patterns from each other. The first wiring pattern is buried in the first transparent electrode substrate by the bonding pressure of the transparent electrode substrates, thereby raising the surface on the opposite side to the transparent electrode substrates. The raised portion is contained in the opening portion formed in the second bonding sheet at the time of bonding to the first transparent substrate. Further, at the time of bonding to the first transparent substrate, air stored in the opening portion is exhausted to the outside of the second transparent electrode substrate through the first through hole, the third through hole, and the second through hole. Accordingly, the flatness of the first transparent substrate is prevented from being impaired due to the residual air in the opening portion. In addition, the desired flatness of the first transparent substrate can be ensured without increasing the thickness of the first bonding sheet.

The method of manufacturing a touch panel according may further include bonding a second transparent substrate including a fourth through hole communicated with the second through hole onto the second transparent electrode substrate, and subsequently sealing the fourth through hole.

With this structure, by bonding the second transparent substrate, the rigidity of the touch panel is increased, and the predetermined flatness can be given to the touch panel. Further, by closing the fourth through hole, a desired inner pressure of the first opening portion can be maintained, and water or a foreign matter can be prevented from getting into the touch panel.

As described above, according to an embodiment, it is possible to obtain the touch panel capable of maintaining the flatness of the surface thereof while maintaining the desirable operability.

Additional features and advantages are described herein, and will be apparent from the following Detailed Description and the figures.

BRIEF DESCRIPTION OF THE FIGURES

FIG. 3 are cross-sectional views of the touch panel taken along the line A-A of FIG. 2, in which FIG. 3A shows a state before a top plate (first transparent substrate) is bonded, and FIG. 3B shows a state after the top plate is bonded;

FIG. 4 are cross-sectional views of the touch panel taken along the line B-B of FIG. 2, in which

FIG. 6 are cross-sectional views of a main part of the touch panel shown in FIG. 5.

DETAILED DESCRIPTION

The present application will be described with reference to the drawings according to an embodiment.

Figure 1:
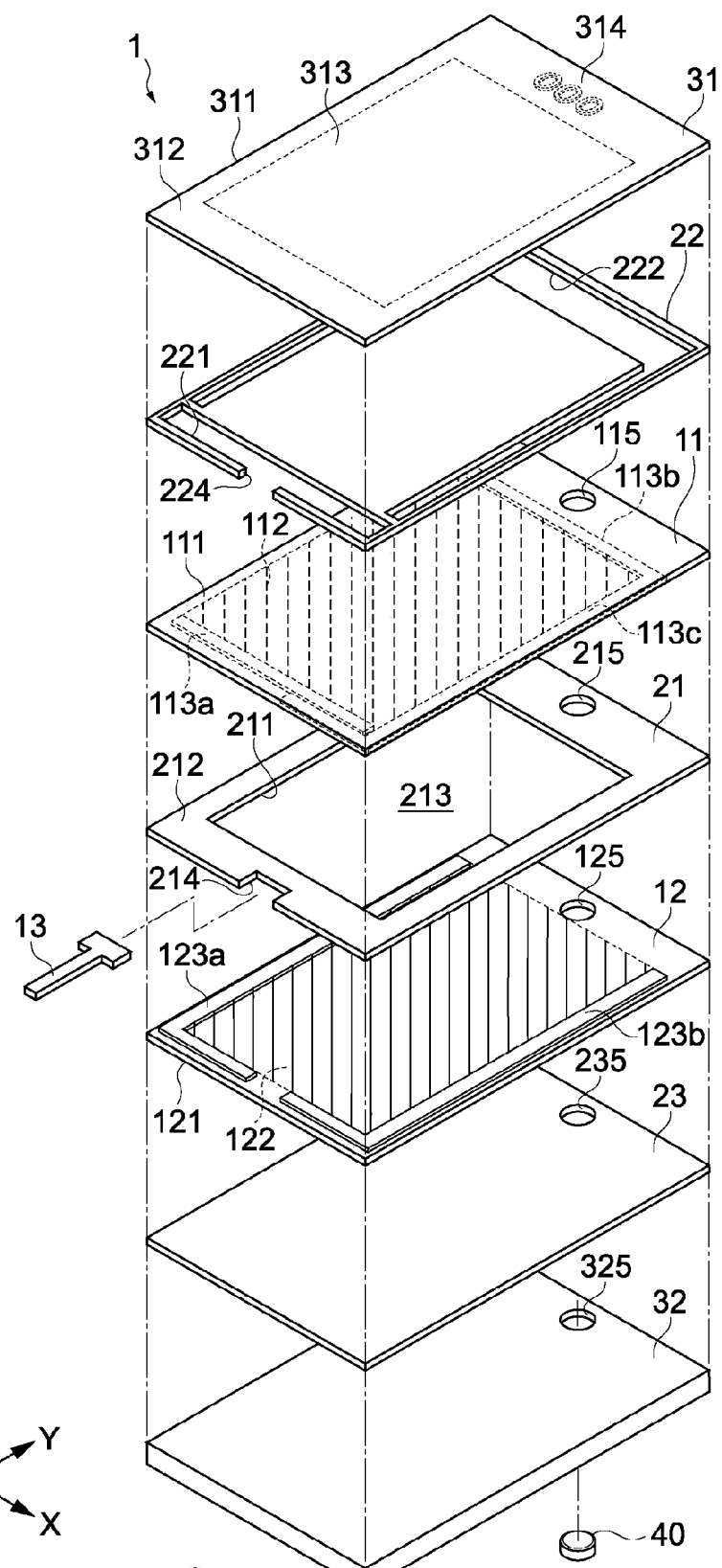
FIG. 1 is an exploded perspective view of a touch panel according to an embodiment.
Figure 2:
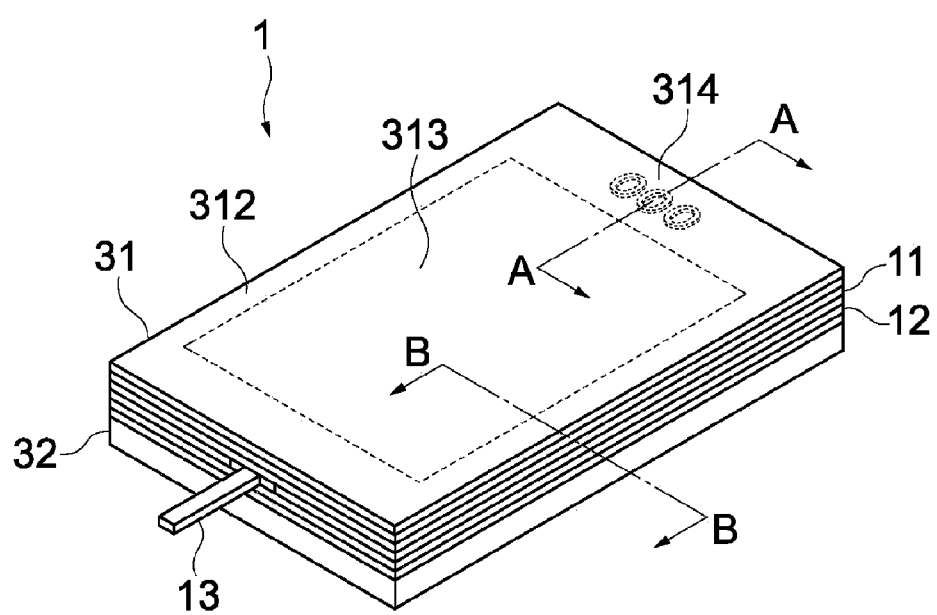
FIG. 2 is an entire perspective view of the touch panel according to the embodiment.

FIG. 1 is an exploded perspective view of a touch panel according to a first embodiment of the present invention. FIG. 2 is an entire perspective view of the touch panel. A touch panel 1 according to this embodiment is formed into a rectangular shape. In the figures, an X-axis direction indicates a short-side direction of the touch panel 1, a Y-axis direction indicates a long-side direction of the touch panel 1, and a Z-axis direction indicates a thickness direction of the touch panel 1.

(Overall Structure)

The touch panel 1 is used as a screen-input display apparatus superposed on a display apparatus such as a liquid crystal panel and an organic EL panel. By pressing the touch panel 1, it is possible to make a direct selection of indications on a display screen of the screen-input display apparatus. The touch panel 1 is an analog resistive film type, for example.

As shown in FIGS. 1 and 2, the touch panel 1 includes an upper substrate 11 (first transparent electrode substrate), a lower substrate 12 (second transparent electrode substrate), and a first bonding sheet 21 (first bonding layer) that bonds the upper substrate 11 and the lower substrate 12 to each other. In addition, the touch panel 1 includes a top plate 31 (first transparent substrate) and a base plate 32 (second transparent substrate). The top plate 31 is bonded to the upper substrate 11 through a second bonding sheet 22 (second bonding layer), and the base plate 32 is bonded to the lower substrate 12 through a third bonding sheet 23 (third bonding sheet).

(Upper Substrate)

The upper substrate 11 is provided with a transparent support body 111, a first resistive film 112 that is transparent, and first wiring patterns 113a, 113b, and 113c.

The support body 111 is made of a flexible plastic film formed of soft polyethylene terephthalate (PET) or the like. The support body 111 is formed into a rectangular shape having a short side in the X-axis direction and a long side in the Y-axis direction. But, the shape of the support body 111 is not limited to this and may be a square shape, for example. The support body 111 has a surface (first surface) on which the first resistive film 112 and the first wiring patterns 113a, 113b, and 113c are formed and a surface (second surface) bonded to the top plate 31.

The first resistive film 112 is formed of a thin film of a transparent conductive oxide such as an ITO (indium tin oxide), an IZO (indium zinc oxide), and $SnO_2$. The first resistive film 112 can be formed by a thin-film formation method such as a sputtering method and a vacuum deposition method. The first resistive film 112 may be formed on the entire surface of the support body 111 or may be formed on an area among the first wiring patterns 113a, 113b, and 113c.

The first wiring patterns 113a, 113b, and 113c are each formed of a conductive material such as a silver paste and formed by a screen printing method, for example. The first wiring patterns 113a, 113b, and 113c are each disposed on a peripheral area on the periphery of the screen display area of the touch panel 1. The first wiring patterns 113a and 113b are electrically connected to the first resistive film 112 in an area where the first wiring patterns 113a and 113b are opposed to each other in the Y-axis direction. Therefore, a predetermined DC voltage is applied between the first wiring patterns 113a and 113b, thereby forming an electrical field that is parallel to the Y-axis direction in the plane of the first resistive film 112. The wiring pattern 113c is used for connecting a wiring substrate 13 (described later) with the wiring pattern 113b and is formed along one long side of the support body 111.

It should be noted that, in a case where the resistive film 112 is formed on the entire surface of the support body 111, a pattern etching is performed on the resistive film 112 so that the electrical field is formed only in the area between the wiring patterns 113a and 113b, which is indicated by the hatching area of FIG. 1. For the pattern etching, a laser beam printing (trimming) can be used, for example. Further, in order to prevent an applied voltage to the wiring patterns 113a and 113b from leaking to the peripheral portion of the touch panel 1, the peripheral portion of the resistive film 112 is subjected to the pattern etching along the periphery of the support body 111.

The support body 111 has a first path 115. The first path 115 is a through hole that penetrates the support body 111 in the Z-axis direction, and is formed in the peripheral area of the support body 111 on the outer side of the wiring pattern 113b. The formation position of the first path 115 is not particularly limited. In this embodiment, the first path 115 is formed at approximately the center portion of a short side area on the side where the wiring pattern 113b is formed. The first path 115 has a circular shape, but the shape is not limited to this. The first path 115 may have a rectangular shape. The size of the passage 115 is not also particularly limited and can be set as appropriate.

(Lower Substrate)

The lower substrate 12 is provided with a transparent support body 121, a second resistive film 122 that is transparent, and second wiring patterns 123a and 123b.

The support body 121 is made of a flexible plastic film formed of soft polyethylene terephthalate (PET) or the like. The support body 121 is formed into a rectangular shape having a short side in the X-axis direction and a long side in the Y-axis direction. But, the shape of the support body 121 is not limited to this and may be a square shape, for example. The support body 121 has a surface (third surface) on which the second resistive film 122 and the second wiring patterns 123a and 123b are formed and a surface (fourth surface) bonded to the base plate 32.

The second resistive film 122 is formed of a thin film of a transparent conductive oxide such as an ITO (indium tin oxide), an IZO (indium zinc oxide), and $SnO_2$. The second resistive film 122 can be formed by a thin-film formation method such as a sputtering method and a vacuum deposition method. The second resistive film 122 may be formed on the entire surface of the support body 121 or may be formed on an area between the second wiring patterns 123a and 123b.

The second wiring patterns 123a and 123b are each formed of a conductive material such as a silver paste and formed by a screen printing method, for example. The second wiring patterns 123a and 123b are each disposed on a peripheral area on the periphery of the screen display area of the touch panel 1. In particular, the wiring pattern 123b are disposed on a position opposed to the first wiring pattern 113c. The second wiring patterns 123a and 123b are electrically connected to the second resistive film 122 in an area where the second wiring patterns 123a and 123b are opposed to each other in the X-axis direction. Therefore, a predetermined DC voltage is applied between the second wiring patterns 123a and 123b, thereby forming an electrical field that is parallel to the X-axis direction in the plane of the second resistive film 122.

It should be noted that, also in the lower substrate 12, in a case where the resistive film 122 is formed on the entire surface of the support body 121, a pattern etching is performed on the resistive film 122 so that the electrical field is formed only in the area between the wiring patterns 123a and 123b, which is indicated by the hatching area of FIG. 1. For the pattern etching, a laser beam printing (trimming) may be used, for example. Further, in order to prevent an applied voltage to the wiring patterns 123a and 123b from leaking to the peripheral portion of the touch panel 1, the peripheral portion of the resistive film 122 is subjected to the pattern etching along the periphery of the support body 121.

The support body 121 has a second path 125. The second path 125 is a through hole that penetrates the support body 121 in the Z-axis direction and is formed at approximately the center portion of one short-side area of the support body 121 so as to be aligned with the first path 115. The second path 125 has a circular shape, but the shape is not limited to this. The second path 125 may have a rectangular shape. The size of the path 125 is not also particularly limited and can be set as appropriate.

(First Bonding Sheet)

The first bonding sheet 21 bonds the upper substrate 11 and the lower bonding substrate 12 to each other. For example, the first bonding sheet 21 is formed of a transparent, double-sided adhesive tape made of an electric insulating material. The thickness of the first bonding sheet 21 is not particularly limited, for example 50 µm.

The first bonding sheet 21 has a rectangular opening portion 211. The opening portion 211 forms a peripheral area 212 (first peripheral area) and an opening area 213. The peripheral area 212 is disposed between the upper substrate 11 and the lower substrate 12 so as to cover the first wiring patterns 113a, 113b, and 113c and the second wiring patterns 123a and 123b. The opening area 213 separates the first resistive film 112 and the second resistive film 122 from each other and causes the resistive films to be opposed. The opening area 213 forms the image display area of the touch panel 1 and forms a press operation area of the touch panel 1.

The first bonding sheet 21 has a cutout portion 214 that releases a mounting area of the wiring substrate 13 that is connected to the upper substrate 11 and the lower substrate 12. The wiring substrate 13 is used for supplying an operation voltage to the first wiring patterns 113a, 113b, and 113c and the second wiring patterns 123a and 123b and is formed of a flexible wiring substrate, for example. The wiring substrate 13 is connected to a control unit of the display apparatus (not shown).

The first bonding sheet 21 further has a third path 215 that causes the first path 115 and the second path 125 to communicate with each other. The third path 215 is a through hole that penetrates the first bonding sheet 21 in the Z-axis direction and is formed in a short-side area opposite to the short-side area where the cutout 214 is formed. The third path 215 has a circular shape, but the shape is not limited to this and may be a rectangular shape. The size of the third path 215 is not also particularly limited and can be set as appropriate. In this embodiment, the third path 215 has the same shape and size as those of the first path 115 and the second path 125 and is formed so as to be aligned to the first and second paths 115 and 125.

It should be noted that a spacer (not shown) that limits the contact area of the first resistive film 112 and the second resistive film 122 is disposed between the upper substrate 11 and the lower substrate 12. The height of the spacer is less than the thickness of the first bonding sheet 21.

(Top Plate)

The top plate 31 forms an operation surface of the touch panel 1 and is disposed so as to cover the upper surface (second surface) of the substrate 11. The top plate 31 has a transparent support body 311, which is formed of a flexible plastic film made of the soft polyethylene terephthalate (PET) or the like. The top plate 31 is bonded to the upper surface of the upper substrate 11 through the second bonding sheet 22 described later.

The top plate 31 includes an operation area (image display area) 313 and a frame-like peripheral area 312 that is disposed therearound. The operation area 313 corresponds to a display area of the screen. The peripheral area 312 corresponds to the peripheral area 212 of the first bonding sheet 21. That is, the peripheral area 312 corresponds to the formation area of the first wiring patterns 113a, 113b, and 113c and the second wiring patterns 123a and 123b. On the inner side (surface opposite to the operation surface) of the peripheral area 312, a print pattern of a predetermined color is given in order to enhance the design effect of the touch panel 1. On the peripheral area 312, a decorative layer 314 is formed.

As shown in FIG. 3A, the decorative layer 314 includes a first print pattern 315 and the second print pattern 317 that are formed on the inner surface of the support body 311. The second print pattern 317 is partially layered on the first print pattern 315 so as to plug up an opening pattern 316 formed in a part of the first print pattern 315. The opening pattern 316 forms a predetermined logo such as a character, a graphic, and a symbol. For the second print pattern 317, paint different from that of the first print pattern 315 is used, with the result that the logo can be clearly displayed.

(Second Bonding Sheet)

The second bonding sheet 22 is used for bonding the top plate 31 and the upper substrate 11 to each other and is formed of a transparent, double-sided adhesive tape made from an electric insulating material. The thickness of the second bonding sheet 22 is not particularly limited, for example, 50 μm.

The second bonding sheet 22 has two opening patterns 221 and 222 from which a part of the peripheral area 312 of the top plate 31 is exposed to the upper surface (second surface) of the upper substrate 11. The opening pattern 221 is linearly formed along one short side of the top plate 31. The formation area of the opening pattern 221 approximately corresponds to the formation area of the first wiring pattern 113a and the bonding area of the wiring substrate 13.

The other opening pattern 222 is formed along the other short side and both the long sides of the top plate 31. The formation area of the opening pattern 222 approximately corresponds to the formation area (first opening portion) of the first wiring patterns 113b and 113c and the formation area (second opening portion) of the decorative layer 314 of the top plate 31. Further, the shape or size of the opening pattern 222 is set so as to communicate with the first path 115.

In an area other than the formation area of the two opening patterns 221 and 222, the second bonding sheet 22 bonds the top plate 31 and the upper substrate 11 to each other. The second bonding sheet 22 further includes a cutout 224 that releases a mounting area of the wiring substrate 13.

(Base Plate)

The base plate 32 is disposed so as to cover the lower surface (fourth surface) of the lower substrate 12. The base plate 32 has a function of increasing the rigidity of the touch panel 1 and giving a predetermined flatness to the operation surface (top plate 31) and has a function as a base in mounting the touch panel 1 to the display device.

The base plate 32 is formed of a transparent glass plate or a transparent plastic plate having a relatively high rigidity, such as a polyethylene terephthalate (PET) plate and an acrylic plate. The base plate 32 is bonded to the lower surface of the lower substrate 12 through the third bonding sheet 23.

The third bonding sheet 23 is used for bonding the base plate 32 and the lower substrate 12 to each other and is formed of a transparent, double-sided adhesive tape made from an electrical insulating material. The thickness of the second bonding sheet 22 is not particularly limited, for example, 50 μm.

The base plate 32 and the third bonding sheet 23 have a path 235 and a path 325 (fourth paths) that are aligned along the direction of the second path 125, respectively. The fourth paths 235 and 325 are formed of a circular through hole that penetrates the third bonding sheet 23 and the base plate 32 in the Z-axis direction, but are not limited to this. The size of the paths 235 and 325 is not particularly limited and can be set as appropriate.

The touch panel 1 in this embodiment further includes a sealing member 40 capable of sealing the fourth path 325 from the lower surface side of the base plate 32. The sealing member 40 is made of a material having an appropriate elasticity, such as rubber and plastic. The sealing member 40 is inserted into the fourth path 325, thereby hermetically sealing the path 325.

(Operation of Touch Panel)

The touch panel 1 in this embodiment, which is structured as described above, is provided on the display apparatus. An image displayed on the display apparatus is passed through the base plate 32, the third bonding sheet 23, the lower substrate 12, the first bonding sheet 21, the upper substrate 11, and the second bonding sheet 22, and the image display area 313 of the top plate 31 and thus is visually recognized by a user.

When the image display area 313 is pressed and operated by the user, the resistive film 112 of the upper substrate 11 and the resistive film 122 of the lower substrate 12 are brought into contact with each other. Then, a voltage signal corresponding to the contact position is output to the control unit through the wiring substrate 13. The control unit detects an icon selected from the icons on the screen based on the output from the touch panel 1. Then, in accordance with the icon selected, the preset control is started. As described above, the touch panel 1 functions as an input interface of various control apparatuses.

(Method of Manufacturing Touch Panel)

Next, a method of manufacturing the touch panel 1 according to this embodiment will be described. Here, FIG. 3 are cross-sectional diagrams each showing a main part of the touch panel 1 taken along the line A-A of FIG. 2, and FIG. 4 are cross-sectional diagrams each showing a main part of the touch panel 1 taken along the line B-B of FIG. 2.

First, the upper substrate 11 and the lower substrate 12 are bonded to each other through the first bonding sheet 21. The peripheral area of the first bonding sheet 21 is intervened between the first wiring patterns 113a, 113b, and 113c and the second wiring patterns 123a and 123b, thereby electrically insulating the wiring patterns.

Subsequently, the base plate 32 is bonded to the lower substrate 12 through the third bonding sheet 23. At this time, the third bonding sheet 23 and the base plate 32 are bonded to the lower substrate 12 so that the path 235 of the third bonding sheet 23 and the path 325 of the base plate 32 are aligned to the path 125 of the lower substrate 12 (FIG. 3A).

Figure 4A:
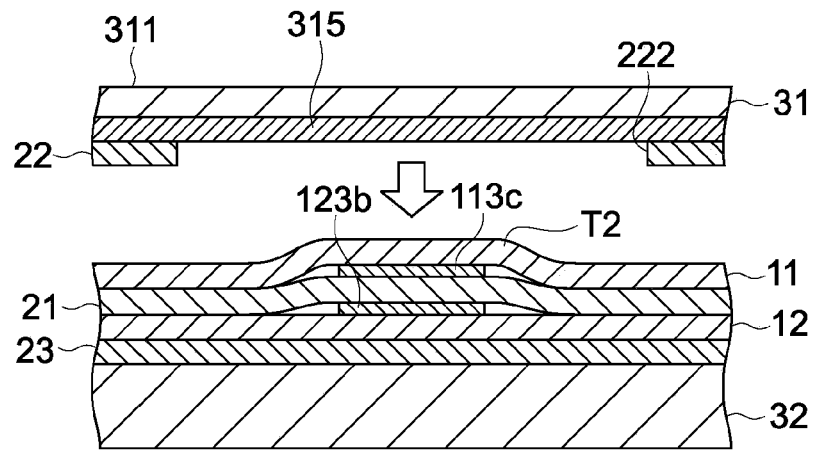
FIG. 4A shows a state before a top plate (first transparent substrate) is bonded.

At this time, the first wiring patterns 113a, 113b, and 113c are buried in the support body 111 by a bonding pressure. On the other hand, the second wiring patterns 123a and 123b are buried in the bonding sheet 21, thereby raising the upper substrate 11 upward. By those operations, the upper surface of the substrate 11 is upraised in the formation areas of the wiring patterns (FIG. 4A). The size of the raised portion is defined based on the thicknesses of the wiring patterns 113a, 113b, 113c, 123a, and 123b, the thickness of the support body 111, the thickness of the bonding sheet 21, the magnitude of the bonding pressure, or the like.

Subsequently, the top plate 31 is bonded to the upper substrate 11 through the second bonding sheet 22. In this embodiment, the second bonding sheet 22 is bonded to the top plate 31, and thereafter the top plate 31 is bonded to the upper substrate 11 through the bonding sheet 22.

Figure 4B:
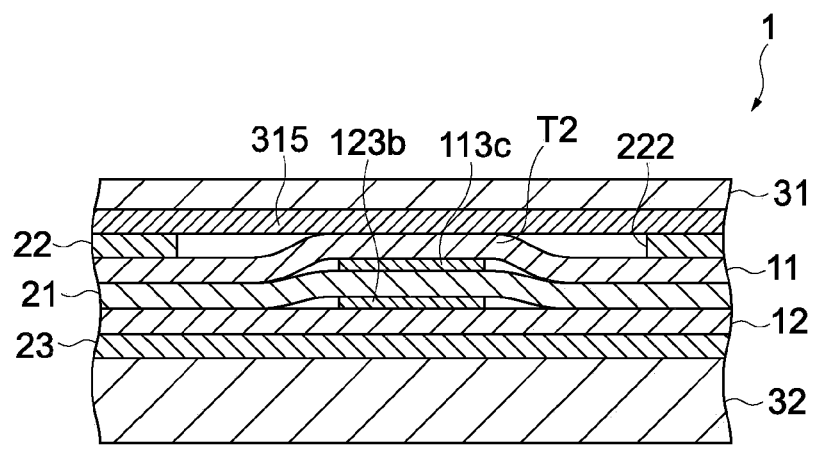
FIG. 4B shows a state after the top plate is bonded.

At this time, the formation area of the decorative layer 314 of the top plate 31 is contained in the opening pattern 222 of the second bonding sheet 22 (FIGS. 4A and 4B). The decorative layer 314 has the layered structure of the first print pattern 315 and the second print pattern 317 as described above. The layered portion of the print patterns forms a protrusion portion T1 that protrudes toward the upper surface of the upper substrate 11. The protrusion portion T1 is contained in the opening pattern 222 of the second bonding sheet 22.

On the other hand, when the upper substrate 11 and the top plate 31 are bonded to each other, a raised portion T2 immediately above the wiring patterns 113a, 113b, 113c, 123a, and 123b is contained in the opening patterns 221 and 222 (FIG. 3B).

To bring the top plate 31 into intimate contact with the upper substrate 11, a pressing roll (not shown) can be used. The pressing roll is moved while giving a predetermined pressing force to the top plate 31 from one short side of the top plate 31 to the other short side thereof along a long side direction (Y-axis direction) of the top plate 31. As a result, the intimate contact between the top plate 31 and the upper substrate 11 can be realized, and the predetermined flatness is given to the top plate 31.

In this embodiment, the protrusion portion T1 of the decorative layer 314 and the raised portion T2 corresponding to the wiring patterns 113a, 113b, 113c, 123a, and 123b are contained in the opening patterns 221 and 222, respectively. Therefore, the raised portion T2 and the protrusion portion T1 can be effectively prevented from being transferred to the upper surface side of the top plate 31. As a result, it is possible to maintain the predetermined flatness for the peripheral area of the top plate 31.

The opening pattern 222 is communicated with the outside of the touch panel 1 through the first to fourth paths. Therefore, at the time when the top plate 31 is pressed, air that remains in the opening pattern 222 can be easily let out. In the same way, the opening pattern 221 is communicated with the outside of the touch panel 1 through the cutout 224, and therefore, at the time when the top plate 31 is pressed, air that remains in the opening pattern 221 can be easily let out. As a result, it is possible to positively prevent the flatness of the peripheral area of the top plate 31 from being degraded due to the expansion of the residual air in the opening patterns 221 and 222, with the result that the touch panel 1 that is excellent in the design can be stably manufactured.

In addition, the opening pattern 222 is formed into a shape in which openings capable of respectively containing the raised portion T2 of the upper substrate 11 and the protrusion portion T1 of the decorative layer 314 are connected with each other. With this structure, by connecting the opening pattern 222 to the path 115, it is possible to positively cause the spaces for containing the raised portion T2 and the protrusion portion T1 to communicate with the outside.

Further, the paths 115, 215, 125, 235, and 325 are formed in the areas outside the wiring patterns, so the formation areas of the wiring patterns are not limited. Accordingly, the touch panel can be manufactured by using an existed manufacturing facility, which can prevent the complication of the manufacturing process of the touch panel. In addition, the paths are formed in the peripheral area 312 of the touch panel 1, with the result that desirable visibility of an image displayed on the image display area 313 can be secured.

In addition, the paths 115, 215, 125, 235, and 325 are formed of the through holes and therefore can be formed easily. Further, the paths 115, 215, 125, 235, and 325 are aligned so as to communicate with one another, constituting a linear path portion P. As a result, it is possible to prevent the flatness of the top plate 31 from being impaired due to crushing of the path portion P at the time when the top plate 31 is pressed.

After the top plate 31 is bonded, the path portion P is sealed by the sealing member 40. By hermetically sealing the path portion P, water or a foreign matter is prevented from getting into the touch panel 1 through the path portion P, with the result that desired characteristics of the touch panel 1 can be maintained. The structure of the sealing member 40 is not particularly limited, as long as the path 325 of the base plate can be closed.

COMPARATIVE EXAMPLE

Figure 5:
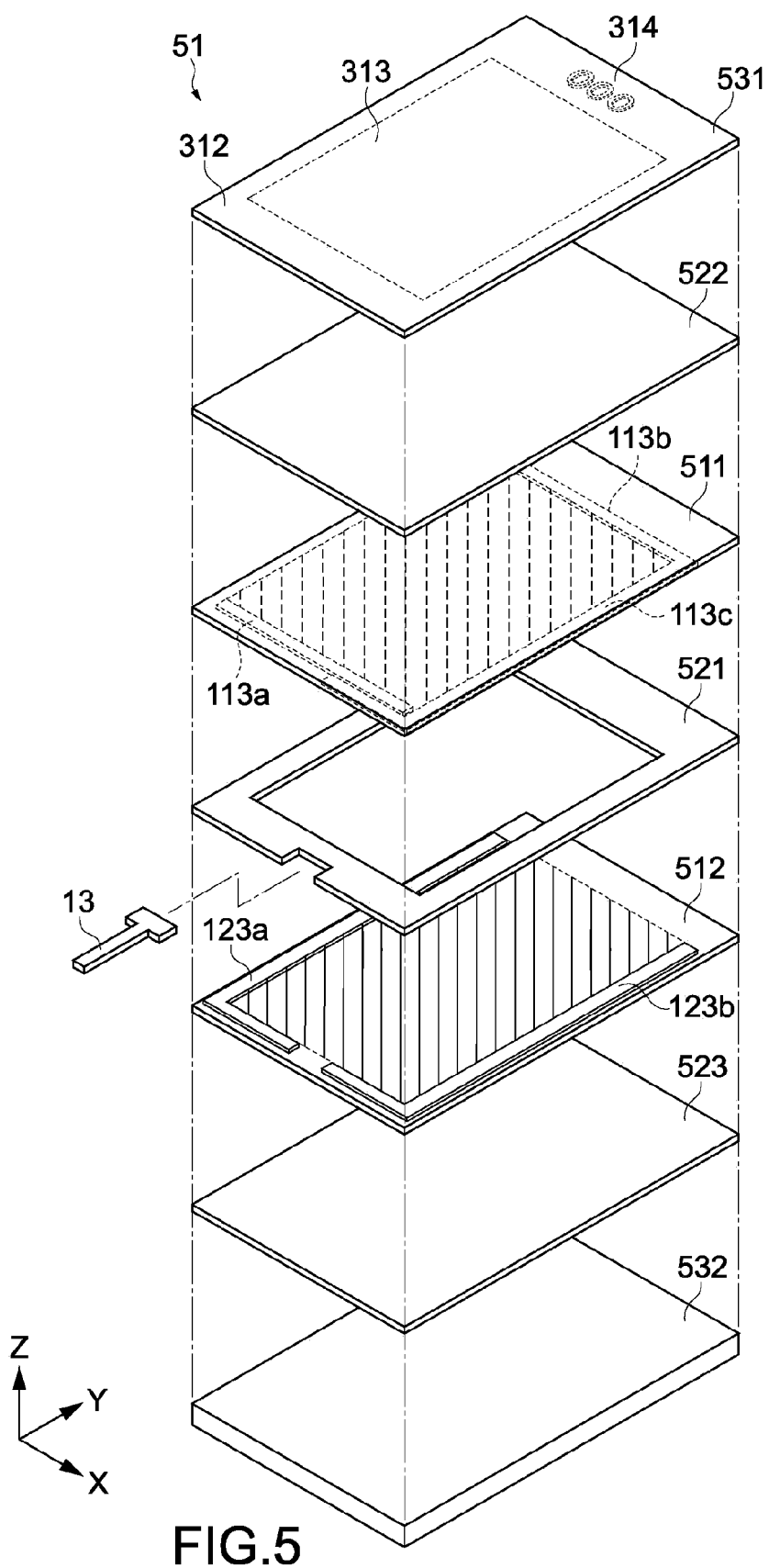
FIG. 5 is an exploded perspective view of a touch panel according to a comparative example.
Figure 7A:
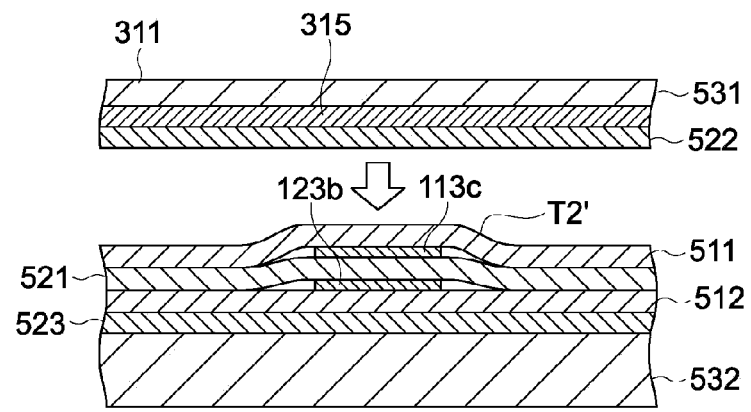
FIG. 7 are cross-sectional views of another main part of the touch panel shown in FIG. 5.
Figure 7B:
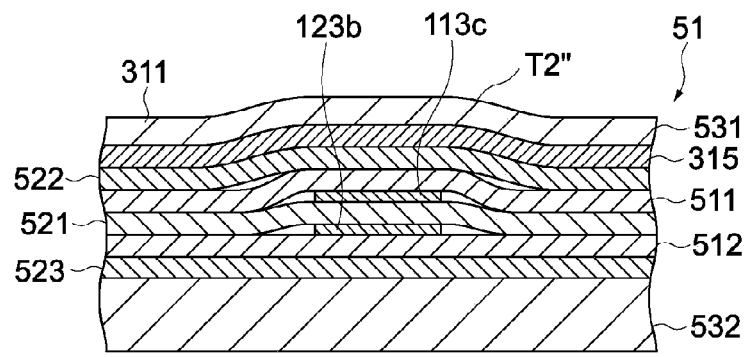

FIGS. 5 to 7 are diagrams showing the structure of a touch panel as a comparative example of the above embodiment. Here, FIG. 5 is an exploded perspective view of a touch panel according to the comparative example, and FIGS. 6A, 6B, 7A, and 7B are cross-sectional views each showing a main part of the touch panel as in FIGS. 3 and 4.

A touch panel 51 according to the comparative example has a structure in which a bonding sheet 523, a lower substrate 512, a bonding sheet 521, an upper substrate 511, a bonding sheet 522, and a top plate 531 are layered on a base plate 532 in the stated order. The difference between the touch panel 1 according to the above embodiment of the present invention and the touch panel 51 according to the comparative example is as follows.

Unlike the upper substrate 11, the lower substrate 12, the base plate 32, and the bonding sheets 21 and 23 of the above embodiment, the upper substrate 511, the lower substrate 512, the base plate 532, and the bonding sheets 521 and 523 of the comparative example do not have the paths 115, 125, 325, 215, and 235. The bonding sheet 522 of the comparative example is different from the bonding sheet 22 according to the above embodiment in that the bonding sheet 522 does not have the opening patterns 221 and 222 and the cutout 224. The top plate 531 of the comparative example has the peripheral area 312, the image display area 313, and the decorative layer 314 as in the case of the top plate 31 of the above embodiment.

FIGS. 6 and 7 show the cross-sectional diagrams of the touch panel 51 of the comparative example, which are taken along the lines corresponding to the lines A-A and B-B of FIG. 2, respectively. In the touch panel 51 of the comparative example, the bonding sheet 522 does not have the opening pattern for containing the protrusion portion T1 of the decorative layer 314. Therefore, on the bonding sheet 522 that covers the decorative layer 314, a protrusion portion T1' is generated as shown in FIG. 6A. As a result, when the top plate 531 is bonded to the upper substrate 511 in such a state, a raised portion T1" is formed by transferring the protrusion portion T1' onto the upper surface side of the top plate 531 as shown in FIG. 6B, with the result that the flatness of the top plate 531 is impaired.

On the other hand, in the touch panel 51 of the comparative example, the bonding sheet 522 does not have an opening pattern for containing a raised portion T2' formed on the upper surface of the upper substrate 511. As a result, when the top plate 531 is bonded to the upper substrate 511, a raised portion T2" is formed by transferring the raised portion T2' onto the upper surface side of the top plate 531 as shown in FIG. 7B, with the result that the flatness of the top plate 531 is impaired.

On the other hand, in the touch panel 51 of the comparative example, by increasing the thickness between the bonding sheet 521 that bonds the upper substrate 511 and the lower substrate 512 to each other, it becomes possible to reduce the generation amount of the raised portions T1" and T2". However, the increase in thickness of the bonding sheet 521 causes the increase in the actuation load of the touch panel 51, which inevitably degrades the operability thereof.

In contrast, according to the above embodiment, the bonding sheet 22 has the opening pattern 222 for containing the protrusion portion T1 and the raised portion T2, and therefore it is possible to prevent the reduction in the flatness due to the protrusion portion T1 and the raised portion T2 after the top plate 31 is bonded. Thus, the design of the peripheral area 312 of the touch panel 1 is improved, and a high-grade touch panel that is excellent in quality of external appearance can be provided.

Further, it is unnecessary to increase the thickness of the first bonding sheet 21, which does not cause the reduction in the operability of the touch panel 1. It should be noted that the thickness of the second bonding sheet 22 is set to such an extent that the protrusion portion T1 and the raised portion T2 can be contained, thereby making it possible to effectively prevent the reduction in the flatness of the upper surface of the top plate 31 due to the protrusion portion T1 and the raised portion T2.

An embodiment of the present application is described above, but the present application is not limited to the above described embodiment, and can be variously modified.

For example, the touch panel 1 according to the above embodiment is described by using the resistive film type touch panel as the example, but is not limited to this. The present invention can be applied to various touch panels provided with a transparent electrode substrate having a wiring pattern, such as a capacitive type and a surface acoustic wave type.

In the above embodiment, the touch panel of the full-flat type having the decorative layer 314 is given as the example. However, the present invention can be applied to a touch panel that is not provided with the decorative layer 314.

Further, in the above embodiment, as the example, the opening portion for containing the protrusion portion T1 of the decorative layer 314 and the opening portion for containing the raised portion T2 of the wiring patterns are formed of the opening pattern 222 that is common to those opening portions. The structure of the opening portions is not of course limited to the above, and the opening portions may be formed of different opening patterns.

In addition, in the above embodiment, the path portion P that causes the opening pattern 222 to communicate with the outside of the touch panel 1 is linearly formed in the Z-axis direction. However, the structure of the path portion P is not limited to this and can be appropriately changed depending on the size of the peripheral area 312, the position of the decorative layer 314, or the like. For example, by forming at least a part of the paths that constitute the path portion P into a long hole shape, the connection point with the opening pattern 222 and the connection point with the outer air can be offset.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch panel, comprising:
a first transparent electrode substrate including a first wiring pattern, a first surface, a second surface, and a first path, the first wiring pattern being formed on the first surface, the second surface being opposite to the first surface, the first path causing the first surface and the second surface to communicate with each other;
a second transparent electrode substrate including a second wiring pattern, a third surface, a fourth surface, and a second path, the second wiring pattern being formed on the third surface, the fourth surface being opposite to the third surface, the second path causing the third surface and the fourth surface to communicate with each other;
a first bonding layer including a first peripheral area, an opening area, and a third path, the first bonding layer bonding the first transparent electrode substrate and the second transparent electrode substrate to each other in the first peripheral area, the first peripheral area being provided between the first surface and the third surface to cover the first wiring pattern and the second wiring pattern, the opening area causing the first surface and the third surface to be separated from and opposed to each other, the third path being formed in the first peripheral area and causing the first path and the second path to communicate with each other;

a first transparent substrate that is opposed to the second surface; and a second bonding layer including a first opening portion that is opposed to a formation area of the first wiring pattern and communicated with the first path, the second bonding layer bonding the second surface and the first transparent substrate to each other.

2. The touch panel according to claim 1, further comprising:

a second transparent substrate including a fourth path that is communicated with the second path, the second transparent substrate being bonded to the fourth surface; and a sealing member to seal the fourth path.

3. The touch panel according to claim 1, wherein the first transparent substrate includes a decorative layer that has a protrusion portion and is formed in a second peripheral area corresponding to the first peripheral area, the protrusion portion being protruded toward the second surface, and wherein the second bonding layer further includes a second opening portion that is opposed to a formation area of the decorative layer and communicated with the first path.

4. The touch panel according to claim 3, wherein the first opening portion and the second opening portion are communicated with each other in the second peripheral area.

5. The touch panel according to claim 3, wherein the decorative layer has a first printing pattern and a second printing pattern, the first printing pattern being formed in the second peripheral area, the second printing pattern being formed partially on the first printing pattern, and wherein the protrusion portion is formed of the second printing pattern.

6. A method of manufacturing a touch panel, comprising:

bonding a first transparent electrode substrate and a second transparent electrode substrate to each other by using a first bonding sheet, the first transparent electrode substrate having a first through hole and a first wiring pattern, the second transparent electrode substrate having a second through hole and a second wiring pattern, the first bonding sheet having a third through hole that is aligned to the first through hole and the second through hole and covering the first wiring pattern and the second wiring pattern; and bonding a first transparent substrate onto the first transparent electrode substrate through a second bonding sheet, the second bonding sheet having an opening portion, the opening portion being formed in an area corresponding to a formation area of the first wiring pattern and being communicated with the first through hole.

7. The method of manufacturing a touch panel according to claim 6, further comprising:

bonding a second transparent substrate including a fourth through hole communicated with the second through hole onto the second transparent electrode substrate, and subsequently sealing the fourth through hole.

* * * * *